United States Patent [19]
Bedo et al.

[11] 3,948,479
[45] Apr. 6, 1976

[54] LABYRINTH TYPE VALVE FOR HIGH PRESSURE DROP APPLICATIONS

[75] Inventors: Alfred Bedo, Raleigh, N.C.; Edward Beck, Cleveland Heights, Ohio

[73] Assignee: Sno-Trik Company, Solon, Ohio

[22] Filed: June 17, 1974

[21] Appl. No.: 479,865

[52] U.S. Cl. ............................... 251/121; 138/42
[51] Int. Cl.² ..................................... F16K 47/04
[58] Field of Search ...... 251/120, 121, 122; 138/42, 138/43

[56] References Cited
UNITED STATES PATENTS

| | | | |
|---|---|---|---|
| 279,595 | 6/1883 | Pugh | 138/42 |
| 1,406,747 | 2/1922 | Massip | 251/122 X |
| 1,481,792 | 1/1924 | Dailey | 138/43 X |
| 1,649,620 | 11/1927 | Siefen | 251/120 X |
| 3,059,894 | 10/1962 | Knecht et al. | 251/121 |
| 3,485,474 | 12/1969 | Baumann | 251/121 |
| 3,679,169 | 7/1972 | Bedo et al. | 251/122 X |

FOREIGN PATENTS OR APPLICATIONS

| | | | |
|---|---|---|---|
| 484,369 | 5/1938 | United Kingdom | 251/121 |

*Primary Examiner*—Henry T. Klinksiek
*Attorney, Agent, or Firm*—Fay & Sharpe

[57] ABSTRACT

A valve particularly adapted for use in obtaining a constant fluid flow output from a variable high pressure fluid input. The valve body includes a fluid passage extending therethrough having a valve seat intermediate the ends thereof. A fluid inlet communicates with the end of the passage on the upstream side of the seat and a fluid outlet communicates with the passage on the downstream side of the seat. An elongated actuating stem is closely received in the passage and includes a plurality of spaced radially extending fins disposed along a portion of its length. Each fin then includes a pair of oppositely disposed orifices to facilitate fluid flow therethrough and the fins are selectively positionable on the stem to provide variable flow characteristics through the valve. The rate of fluid flow through the valve may be easily regulated by adjusting the degree of insertion of the stem within the passage so as to yield the desired constant output flow rate.

12 Claims, 3 Drawing Figures

LABYRINTH TYPE VALVE FOR HIGH PRESSURE DROP APPLICATIONS

BACKGROUND OF THE INVENTION

This invention pertains to the art of valves and more particularly to valves for use in high fluid pressure drop applications.

The invention is particularly applicable to situations wherein the fluid supply to a system is variable and at substantially higher pressures than the desired output pressures where it is particularly desired to obtain a constant rate of fluid output from the valve outlet. Although the invention will be described with specific reference to this particular environment, it will be appreciated by those skilled in the art that the invention has broader applications and may be employed in other environments for controlling high pressure fluid flow.

Prior valves of this general type, that is, valves for use in obtaining a constant rate of fluid flow at high input pressures generally varying from about 600 to 2500 psi have comprised what are normally termed labyrinth type valves. In such valves, the fluid is forced through a random labyrinth arrangement whereby the fluid is necessarily required to take a tortuous path as it flows from the fluid inlet toward the fluid outlet. This tortuous path has the effect of dissipating pressure as the fluid passes from the valve inlet toward the outlet. Regulation of this dissipation along such a tortuous path is made possible by a valve actuator or stem which facilitates altering the effective length of the path in order that the desired output flow may be obtained. Normally, the labyrinth arrangement in prior valves of this type has been formed integrally into either the valve body or the actuator stem which thus necessitates the use of undesired precise metal removal or etching techniques.

These precise machining or etching techniques require a substantial amount of additional valve manufacturing time and effort which, of course, add to production costs. Also, and from an operational standpoint, the labyrinth type structure employed in prior valves of this general type is such that foreign contaminants dispersed in the fluid have had a distinct tendency to partially or completely clog portions of the tortuous path. Such labyrinth clogging produces changes in valving characteristics so as to require constant monitoring and adjustment in order to obtain a desired constant output fluid flow rate. This generates additional maintenance difficulties.

The present invention contemplates a new and improved arrangement which overcomes the above described problems and others and provides a new valve for use in high pressure drop applications which is simple, economical, reliable, readily adaptable to use in a variety of applications in high pressure fluid environments and which provides simple means for altering the physical make-up of the labyrinth arrangement.

The principal object of the present invention is the provision of a new and improved labyrinth type valve for use in high pressure drop applications which is simple in both construction and operation.

Another object of the present invention is the provision of a new and improved labyrinth type valve for use in high pressure drop applications which may be employed to provide an accurate, constant rate of fluid flow output.

Another object of the present invention is the provision of a new and improved labyrinth type valve for use in high pressure drop applications which is simple to manufacture.

Still another object of the present invention is the provision of a new and improved labyrinth type valve for use in high pressure drop applications which is readily adapted for use in a plurality of fluid environments.

Still a further object of the present invention is the provision of a labyrinth type valve for use in high pressure drop applications which may be employed to provide a constant rate of fluid flow output over a wide range of pressures.

Yet another object of the present invention is the provision of a new and improved labyrinth type valve for use in high pressure drop applications wherein the physical characteristics of the labyrinth arrangement may be readily altered as may be desired for a particular valve application.

BRIEF DESCRIPTION OF THE INVENTION

In accordance with the present invention, the valve provided for producing a constant rate of fluid output from a variable high pressure fluid input comprises a valve body having first and second ends including an elongated stem receiving passage extending between such ends, and with a valve seat disposed intermediate the ends of the passage. A fluid inlet extends through the valve body to communicate with the passage on the upstream side of the valve seat and a fluid outlet communicates with the passage on the downstream side of the valve seat. An elongated valve stem is received within the passage to define, in combination with the walls of the passage, an annular fluid flow chamber at least partially over the length thereof with the stem being selectively movable axially within the passage to permit varying the length of the annular chamber thus defined. The stem includes a plurality of axially spaced, radially extending fins over a portion thereof with the fins including means for permitting fluid flow therepast in a direction generally axial of the stem. The location of the fluid flow means on at least selected of adjacent fins is such as to establish a tortuous fluid flow path over at least a portion of the passage between the fluid inlet and outlet.

In accordance with another aspect of the present invention, the fin defining means comprises a plurality of first and second annular sleeves received over a portion of the actuating stem with the first sleeves each having a diameter larger than that of the second sleeves.

In accordance with still another aspect of the present invention, the actuating stem and at least the first sleeves include cooperating means for positively locating and orienting the first sleeves on the stem.

In accordance with a further aspect of the present invention, the first sleeves each include a pair of oppositely disposed fluid flow orifices therein.

In accordance with still a further aspect of the present invention, means are included for releasably retaining the first and second sleeves in position on the stem and for permitting the relative positioning of the sleeves thereon to be selectively varied.

BRIEF DESCRIPTION OF THE DRAWINGS

The invention may take physical form in certain parts and arrangements of parts, the preferred embodiment of which will be described in detail in this specification and illustrated in the accompanying drawings which form a part hereof and wherein.

DESCRIPTION OF THE PREFERRED EMBODIMENT

Figure 1:
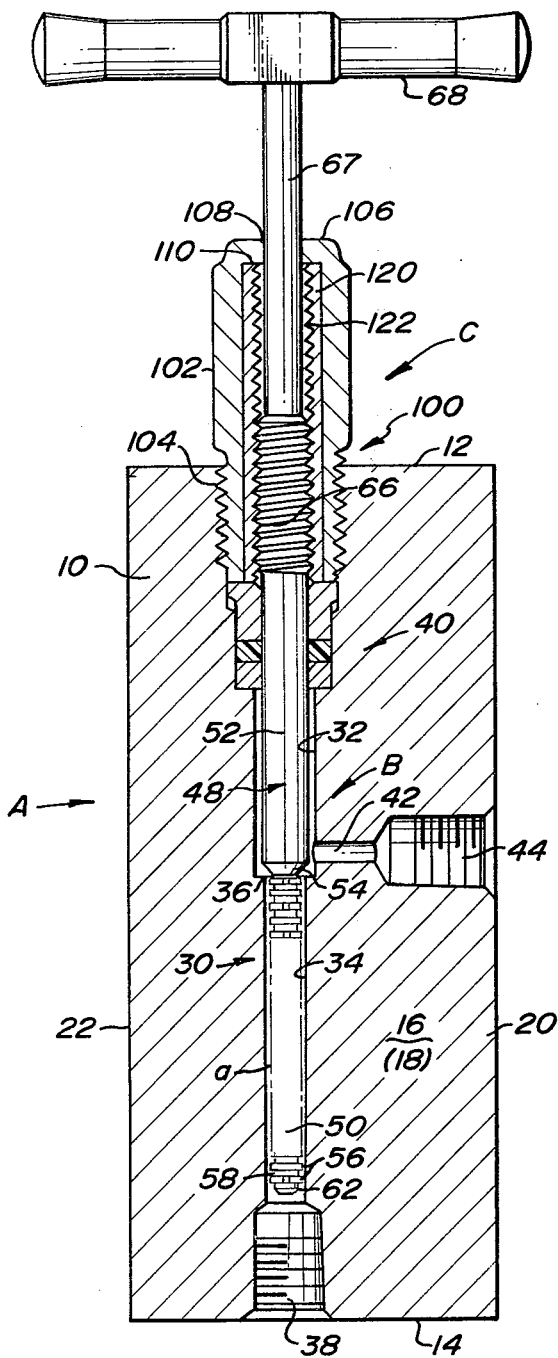
FIG. 1 is a longitudinal cross-sectional view of a valve which incorporates the concepts of the subject invention.

Referring now to the drawings wherein the showings are for purposes of illustrating the preferred embodiment of the invention only and not for purposes of limiting same, the FIGURES show a valve body A, valve stem assembly B and stem packing and retaining assembly C. Certain of the component structure employed in practicing the present invention is shown in the commonly assigned U.S. Pat. No. 3,679,169, which showings and teachings are incorporated herein by reference.

More specifically and with reference to FIG. 1, valve body A includes a generally elongated body portion 10 having a top wall 12, bottom wall 14, opposed side walls 16,18 and opposed end walls 20,22. Extending through the valve body between top and bottom wall 12,14 is a passage generally designated 30. This passage includes an upper portion 32 and a lower portion 34 with the upper portion having a slightly larger diameter than the lower portion. The area of connection or merger between the upper and lower portions defines a valve seat 36. Disposed at the end of passage 30 adjacent bottom wall 14 is an enlarged fluid fitting receiving area 38 which is shown as being threaded to receive a conventional male fitting. This area acts as the fluid inlet for the valve. Disposed at the end of passage 30 adjacent top wall 12 is an enlarged sealing medium receiving area generally designated 40 which will be described in greater detail hereinafter. A fluid outlet passage 42 extends inwardly from end wall 20 to communicate with passage 30 in upper portion 32 thereof. Extending inwardly along outlet passage 42 from end wall 20 is an enlarged fitting receiving area 44 which is also adapted to threadedly receive a conventional male coupling. Although the valve body may be constructed from several materials, an austenitic stainless steel is preferred.

With particular reference to both FIGS. 1 and 2, discussion will hereinafter be directed to stem assembly B. Accordingly, this assembly comprises an elongated stem member generally designated 48 having an elongated lower or first portion 50 and an elongated upper or second portion 52. First and second portions 50,52 are joined by a tapered area 54 which is cooperable with valve seat 36 for selectively establishing a seat to terminate flow through the valve. Although a number of taper angles may be effectively employed, a taper angle of 30° relative to the axis of the stem is preferred. Disposed along at least a portion of lower portion 50 are a plurality of axially spaced radial extending fins which, at their peripheries, are closely spaced from the walls of lower portion 34 of the passage. As shown best in FIGS. 2 and 3, these fins are comprised of a plurality of first annular sleeves 56 spaced apart from one another by a plurality of second annular sleeves 58. These sleeves are closely received over lower portion 50 of actuating stem 48 and include means for maintaining at least first sleeves 56 in a predetermined orientation relative to one another for reasons to be more fully explained hereinbelow. Although a number of conventional means may be employed for this purpose, the key and keyway arrangement shown in the drawings has been found to be quite adequate.

Each of the first sleeves also includes a pair of fluid flow orifices 60 extending therethrough. In the preferred embodiment of the present invention, these orifices comprise arcuately shaped openings extending radially inwardly from the outer peripheral edge of each sleeve. The openings are disposed in each sleeve such that they extend generally axially of the stem when the sleeve is in position thereon. Of course, it will be appreciated that other orifices may be employed such as, for example, drilled holes and the like, without departing from the intent and scope of the present invention.

When practicing the concepts of the invention, a series of the first and second annular sleeves are disposed in a generally alternating fashion on lower portion 50 of the actuating stem so that the initial sleeve received on portion 50 abuts tapered area 54. The first sleeves are normally positioned such that the pair of oppositely disposed orifices 60 in each sleeve are spaced a quarter turn out of alignment with the first sleeves immediately adjacent thereto on either side thereof. That is, and as best shown in FIGS. 2 and 3, alternating ones of the first sleeves have their respective fluid flow orifices 60 in axial alignment with one another. The series of first and second sleeves 56,58 are then maintained in lower portion 50 by means of a conventional threaded member 62 threadedly received by threads 64 in the lowermost end of stem 48. At least the first sleeves are then retained from rotational movement by, for example, the key and keyway arrangement shown in FIG. 3.

Figure 2:
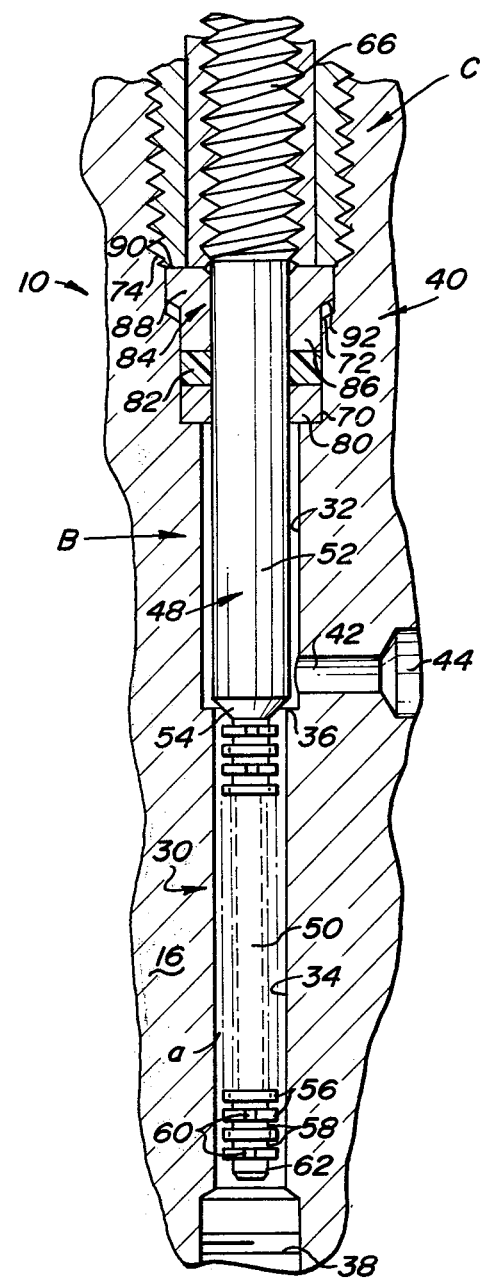
FIG. 2 is an enlarged view of a portion of the valve shown in FIG. 1 with particular focus on the valve actuating stem structure; and, FIG. 3 is an exploded view showing the relative arrangement of first and second sleeves on the valve stem.
Figure 3:
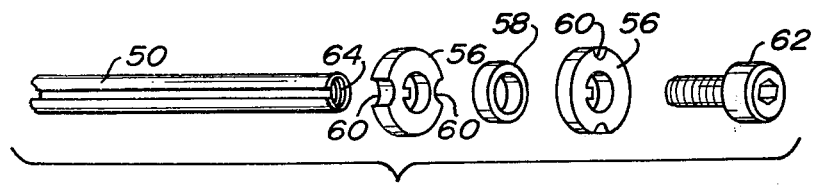

With particular reference to FIG. 2, and with the arrangement of alternating first and second sleeves 56,58 shown therein over the total length of lower portion 50 of stem 48, fluid flowing into the valve through inlet area 38 will pass along lower portion 34 of passage 30 toward outlet passage 42. Since annular sleeves 56 are closely received within lower portion 34, much of the fluid must pass through orifices 60 in each of the first sleeves. Inasmuch as the orifices of adjacent of these sleeves are a quarter turn out of alignment with one another, the fluid must thus take a tortuous path as it passes along the passage from the inlet end toward the outlet end. This path permits effective dissipation of the high fluid pressure entering the fluid inlet since the fluid must traverse the limited tortuous path during travel through the valve. That is, because of the particular structural arrangement described, fluid entering the inlet at high pressure may be controlled to dissipate pressure and achieve a constant rate of fluid output by means of the degree of insertion of stem 48 into fluid passage 30. The further the insertion of the stem into the passage, the longer the effective length of the tortuous path which the fluid must traverse. Lengthening the tortuous path increases the resistance to fluid flow to facilitate greater dissipation of fluid pressure.

By way of a more specific structural example, satisfactory results have been obtained in a valve having a lower portion 34 with a 0.250 inch diameter, first annular sleeves 56 with a 0.249 inch outside diameter, second sleeves 58 with a 0.226 inch outside diameter and with both the first and second sleeves having a thickness of 0.034 inch. Although in a standard structural arrangement, the large and small sleeves are normally contemplated as alternating with one another, it is entirely possible to obtain different valve flow characteristics by having a greater or lesser number of one or the other of these sleeves disposed along the stem. The desired combination may be easily obtained by merely removing threaded element 62 from engagement with stem 48 and rearranging the sleeves as desired. For example, satisfactory results have been obtained when the stem has 30 first sleeves and 31 second sleeves, 26 first sleeves and 35 second sleeves and 34 first sleeves and 27 second sleeves. Naturally, with these alternative arrangements, the flow characteristics of the valve change and such characteristics may be further altered by other possible arrangements.

As an alternative to the arrangement shown in FIG. 3, and for purposes of locating the first sleeves on lower portion 50 of stem 48, it is possible to manufacture portion 50 of the stem so as to have a rectangular or square cross-sectional configuration with sleeves 56,58 having corresponding rectangular or square center hole areas adapted to be closely received over the lower stem portion. This arrangement then eliminates the necessity for the key and keyway arrangement and also adds a degree of versatility in requiring only a single style of first sleeve 56.

Adjacent second portion 52 of stem member 48 is a threaded area 66 and adjacent that threaded area is an elongated stem extension 67 which has a conventional handle 68 disposed at the outermost end thereof. Use of these features will be described in detail hereinafter. Although a martensitic stainless steel stem construction is preferred, other materials may also be employed without departing from the scope and intent of the present invention.

Stem member 48 is received in passage 30 so that elongated first portion 50 extends substantially through the length of lower portion 34 and the second portion 52 extends over the length of upper portion 32 when tapered area 56 is in physical engagement with valve seat 36. Again, dimensions of the passage and stem, including the fins or first sleeves 56 are such that a thin annular fluid flow path a is defined between the outer peripheral edges of sleeves 56, including orifices 60, and the inner peripheral surface of passage 30.

To locate and properly retain stem member 48 within passage 30 of valve body 10, use is made of enlarged sealing medium receiving area 40. This area is comprised of a bore portion 70 which is slightly larger than upper portion 32 of passage 30. Adjacent the end of the larger diameter portion toward top wall 12 is an outwardly flaring or frusto-conical surface portion 72 which is then connected to an even larger, partially threaded packing nut receiving portion 74. The effect and use of bore portions 70,72 and 74 will become apparent hereinafter.

Disposed in larger diameter bore portion 70 is a seal washer 80. This washer is generally annular in shape having an outside diameter slightly less than the diameter of bore 70 and an inside diameter slightly in excess of the outside diameter of stem second portion 52. A sealing member 82 is received in bore 70 adjacent washer 80. In the preferred embodiment of the invention, this member is manufactured from glass-filled TEFLON, is generally annular in shape and has an outside diameter slightly less than the diameter of bore 70 with an internal diameter slightly larger than the outside diameter of stem second portion 52.

An alignment bushing 84 includes a forward portion 86 having an outside diameter slightly less than the diameter of bore 70 and an internal passageway having a diameter slightly in excess of the outside diameter of stem portion 52. The alignment bushing also includes a flange portion 88 defining a thrust surface 90 which lies in a plane generally transverse to the axis of passage 30. Flange portion 88 is connected to forward portion 86 by a generally frusto-conical surface 92. In the preferred embodiment of the invention, seal washer 80 and alignment bushing 84 are constructed from stainless steel; however, it will be appreciated that other materials may be employed.

A packing nut 100 having a generally cup-like configuration is received in packing nut receiving portion 74 of receiving area 40 adjacent top wall 12. Specifically, this nut includes an outer peripheral surface 102 having a plurality of threads 104 extending axially therealong over a portion thereof from the open end toward the closed or top wall 106. Threads 104 engage corresponding threads extending inwardly along bore 74 from top wall 12. The packing nut includes a passageway 108 extending through top wall 106 and the top wall itself defines an internal shoulder 110. The nut further includes a conventional external hex configuration which is adapted to be engaged by a tool or other suitable instrument for purposes of rotating the nut relative to the valve body. The lower extremity of the packing nut, that is, the open end of the cup-like configuration, defines a driving surface which lies in a plane generally parallel to alignment bushing thrust surface 90. A keeper (not shown) or other convenient known means, suitably operates against the outer hex configuration in order to retain the nut in position by prohibiting undesired rotation of the packing nut in any manner once the required compressive force has been applied to sealing member 82.

Disposed within the packing nut and cooperating therewith is a liner sleeve 120 which includes a threaded bore 122. The liner sleeve is generally cylindrical and is adapted to be received within packing nut 100 with the uppermost end portion of the sleeve engaging shoulder 110 of the nut. The packing nut and liner sleeve structure, as well as the means for venting fluid leakage past the sealing member will be appreciated from the teachings of the U.S. Pat. No. 3,679,169 which are incorporated herein by reference.

In the embodiment of the invention under discussion, liner sleeve 120 is constructed from brass or other similar material and the packing nut and actuating stem are constructed from stainless steel. Such an arrangement tends to reduce galling of the threaded connection between the stem and packing nut under high pressure conditions although it will be appreciated that other materials could be employed. The valve itself may be conveniently located and connected to a base plate or the like (not shown) by mounting bolts received in, for example, top wall 12 as is also deemed conventional.

In using the above described structure and with inlet 38 connected to a source of high pressure fluid and with outlet 44 and passage 42 connected to a fluid outlet, description of the operation of the valve will hereinafter be made. If no fluid flow through the valve is desired, stem assembly 48 is merely turned by means of handle 68 through its threaded connection with liner 120 to a position wherein tapered area 54 engages valve seat 36. As fluid flow through the valve is desired, the stem assembly is rotated by means of handle 68 in the other direction so that tapered area 54 is withdrawn from its association with the valve seat. Depending upon the fluid inlet pressure and the force dissipation required to obtain the desired flow rate from the valve, the stem assembly is merely adjusted so that greater or lesser amount of elongated first portion 50 of stem member 48 extends into lower portion 34 of passage 30. Valve operation as to flow rates may be conveniently calibrated by reference to operational charts, etc. to precisely adjust the valve for the desired rate of output knowing input pressure and flow rate.

The stem adjustment determines the effective length of flow path $a$ within lower portion 34 which determines the amount of restriction to fluid flow so as to achieve the final desired output rate. Again, narrow flow path $a$ and the tortuous path defined by orifices 60 in first sleeves 56 will restrict fluid flow over the extent of the stem association with lower portion 34 of passage 30. Thus, to obtain a constant rate of flow at the output side of the valve, the stem may be adjusted so that the elongated second portion 52 extends further into lower portion 34 for higher fluid pressure inputs than for lower pressure inputs. This particular valve structure is considered to be extremely useful for fluid pressures ranging from between 600 to 2500 psi. In addition to the adjustment available by means of relative position of the actuating stem within the valve body, further flow characteristics may be obtained by altering the specific arrangement of first and second sleeves 56,58 on lower portion 50 of actuating stem 58 as previously discussed.

The invention has been described with reference to the preferred embodiment. Obviously, modifications and alterations will occur to others upon the reading and understanding of the specification. It is our intention to include all such modifications and alterations insofar as they come within the scope of the appended claims or the equivalents thereof.

Having thus described the invention, we now claim:

1. A valve device for obtaining a constant rate of fluid output from a variable high pressure fluid input, said valve comprising:

a valve body having first and second ends including an elongated stem receiving passage extending between said ends; a valve seat disposed along said passage intermediate of said ends; a fluid inlet communicating with the passage on one side of said valve seat adjacent said second end, at least that portion of said passage extending between said fluid inlet and said valve seat being smoothed walled and having a substantially constant diameter over the axial length thereof; and, a fluid outlet communicating with said passage on the other side of said valve seat;

an elongated valve stem receivable within the passage to define an annular fluid flow chamber a least partially over the length thereof and including a seat engaging area thereon, the stem further including an elongated fluid flow control portion comprised of a plurality of first and second interchangeable annular sleeves releasably received thereon with said first sleeves defining a plurality of axially spaced apart, radially extending fins and said second sleeves defining spacer members, said first sleeves having diameters greater than the diameters of the second sleeves and including fluid flow means therein for allowing fluid flow therepast generally axial of said stem, said stem being selectively movable within said passage between a first position with said seat engaging area in engagement with said seat for blocking fluid flow from said inlet to said outlet with said flow portion of said stem fully inserted into that portion of said passage extending between said seat and said fluid inlet and a second position with said seat engaging area spaced from said seat toward said valve body first end with a portion of said flow control portion withdrawn from that portion of said passage between said seat and said inlet, said flow control portion of said stem establishing a variable tortuous fluid flow path along at least a portion of said passage between the fluid inlet and outlet for obtaining the desired constant rate of fluid output through the valve from a variable high pressure input; and, alignment and sealing means for said valve stem disposed adjacent the first end of the valve body.

2. The valve as defined in claim 1 wherein the fluid flow means comprises fluid flow orifices extending generally axially through the first sleeves.

3. The valve as defined in claim 2 wherein the actuating stem and at least the first sleeves include cooperating means for locating the first sleeves on the stem relative to each other.

4. The valve as defined in claim 2 wherein the fluid flow orifices of selected of the first sleeves are in general axial alignment with one another.

5. The valve as defined in claim 4 wherein each first sleeve includes a pair of said fluid flow orifices oppositely disposed from each other, said orifices each comprising an axially extending groove.

6. The valve as defined in claim 1 wherein said alignment and sealing means is disposed at said first end of said valve body and comprises a rigid seal washer having a bore slightly larger than the diameter of said stem and providing a sliding fit for said stem; a sealing member disposed adjacent said seal washer; a stem alignment bushing adjacent said sealing member with said bushing having a bore slightly larger than the diameter of said stem and providing a sliding fit for said stem; a packing nut threadedly received in said valve body at said first end adapted to contact said bushing and apply a compressive force to said sealing member; and, a liner sleeve received in said packing nut for engagement with said stem.

7. The valve as defined in claim 6 wherein said stem extends outwardly of the valve body from said first end and includes a threaded portion in threaded engagement with said liner, whereby rotation of said stem effects corresponding reciprocal movement thereof within said passage.

8. In a valve device of the type used to achieve a constant rate of fluid output from variable high pressure fluid inputs wherein an elongated valve stem is selectively movable within a smooth walled fluid flow passage to facilitate different lengths of insertion for said stem in said passage for regulating the dissipation of fluid pressures as the fluid flows through the passage from a fluid inlet toward a fluid outlet, the improvement comprising:

said valve stem having a fluid flow control portion thereon comprised of a plurality of interchangeable first and second annular sleeves releasably received over a portion thereof with said first sleeves defining a plurality of axially spaced apart radially extending fins, said first sleeves having diameters greater than the diameters of the second sleeves and including fluid flow orifices therein to permit fluid flow therepast generally axial of the stem and to establish a variable tortuous fluid flow path along at least a portion of said passage between the fluid inlet and outlet.

. The improvement as defined in claim 8 wherein fluid flow orifices extend generally axially through first sleeves.

10. The improvement as defined in claim 9 wherein said stem and at least said first sleeves include cooperating means for locating said first sleeves on the stem relative to each other.

11. The improvement as defined in claim 9 wherein the flow orifices of selected of the first sleeves are in axial alignment with one another.

12. The improvement as defined in claim 11 wherein each first sleeve includes a pair of said fluid flow orifices oppositely disposed from each other, said orifices each comprising an axially extending groove.

* * * * *